United States Patent Office 2,798,864
Patented July 9, 1957

2,798,864

TERNARY POLYMERS OF ACRYLONITRILE, A 2-ALKENYL DIHYDROXYALKANYL ETHER AND EITHER AN ALKYL ACRYLATE OR A VINYL PYRIDINE

Walter M. Thomas, Springdale, Conn., assignor to American Cyanamid Company, New York, N. Y., a corporation of Maine No Drawing. Application December 22, 1951,
Serial No. 263,011

13 Claims. (Cl. 260—80.5)

This invention relates to new and useful compositions of matter, and more particularly is concerned with polymerized acrylonitrile compositions. The present invention is especially directed to polymerized compositions comprising (1) a 2-alkenyl dihydroxyalkanyl ether, more particularly a 2-methylenealkanyl dihydroxypropyl ether and specifically 3-allyloxy-1,2-propanediol, and (2) acrylonitrile, the compound of (1) constituting from about 1% to about 20% by weight of the total amount of (1) and (2). The scope of the invention also includes method features whereby new and useful synthetic compositions, more particularly copolymers, are produced.

The claims in the present application are directed specifically to compositions comprising a ternary polymer which is a product of polymerization of a mixture of copolymerizable ingredients including, by weight, (1) more than 50% of acrylonitrile (e. g., an amount such that at least 85% by weight of combined acrylonitrile is present in the ternary polymer), (2) a 2-alkenyl dihydroxyalkanyl ether containing from 3 to 4 carbon atoms, inclusive, in the dihydroxyalkanyl radical thereof and being present in an amount corresponding to from about 1% to about 20% of the total weight of the said acrylonitrile and the said 2-alkenyl dihydroxyalkanyl ether, and the remainder being (3) a compound of the class consisting of alkyl acrylates and vinylpyridines.

Homopolymeric acrylonitrile and many of the copolymers of acrylonitrile heretofore known are relatively insoluble and hydrophobic materials. These characteristics make the dyeing of shaped articles or structures prepared from such polymerization products a difficult problem; as a result, the standard dyeing techniques usually cannot be employed satisfactorily. Consequently there has been a great need for a convenient and economical means of modifying the properties of an acrylontrile polymerization product so as to render it hydrophilic and thereby improve its dye receptivity and other useful properties.

It is a primary object of the present invention to prepare a new class of copolymers or interpolymers for use in industry.

Another object of the invention is to improve the usefulness of 2-alkenyl dihydroxyalkanyl ethers whereby their field of utility is enhanced.

Still another and important object of the invention is the production of acrylonitrile copolymers into which hydrophilic groups have been incorporated and which, therefore, are more receptive to dyes and other effect agents than many of the other copolymers of this general type or kind which previously have been prepared.

Another object of the invention is to prepare acrylonitrile copolymers which can be spun or otherwise shaped to form filaments, tapes, ribbons, rods, tubes, sheets, etc., and the shaped articles then dyed either before or after having been oriented to improve their useful properties.

Other objects of the invention will be apparent to those skilled in the art from the description and examples which follow.

The foregoing objects are attained by polymerization of a mixture of copolymerizable monomers including (1) a 2-alkenyl dihydroxyalkanyl ether and (2) acrylonitrile. In this mixture the compound of (1) constitutes from about 1% to about 20%, and preferably from about 2% to about 15%, by weight of the total amount of (1) and (2). The copolymers of the present invention advantageously are produced, for instance, by polymerizing in an aqueous medium, with the aid of a polymerization catalyst, a mixture of comonomers of the kind and in the proportions just mentioned and, at the end of the polymerization period, isolating the resulting copolymer.

The 2-alkenyl dihydroxyalkanyl ethers used in practicing the present invention also may be named as allylic alcohol monoethers of trihydric alcohols. A more specific class of such ethers, and which I prefer to use in practicing my invention, are those in which the dihydroxyalkanyl radical is a 2,3-dihydroxypropanyl radical, —CH$_2$CH(OH)CH$_2$OH, and in which the 2-alkenyl radical contains a terminal methylene grouping (CH$_2$=). These preferred ethers may be designated as 2-methylenealkanyl dihydroxypropyl ethers. Of such preferred ethers, particularly useful acrylonitrile copolymers are produced from those ethers in which the 2-methylenealkanyl dihydroxypropyl ether radical contains not more than about 6 carbon atoms. Illustrative examples of 2-alkenyl dihydroxyalkanyl ethers, all of which contain from 3 to 4 carbon atoms, inclusive, in dihydroxyalkanyl radical thereof, are:

2-allyloxy-1,3-propanediol
3-allyloxy-1,2-propanediol
Crotyl-2,3-dihydroxy-2-methylpropyl ether
2-methyl-2-propenyl-2,3-dihydroxybutyl ether
2-pentenyl-2,4-dihydroxybutyl ether
2-pentenyl-1,1-dimethyl-2,3-dihydroxypropyl ether
2-methylenepentyl-1,3-dihydroxypropyl ether
2-methylenepentyl-2,3-dihydroxypropyl ether Illustrative examples of 2-methylenealkanyl dihydroxypropyl ethers are:

3-allyloxy-1,2-propanediol
1-methyl-2-methylenepropyl-2,3-dihydroxypropyl ether
2-methylenebutyl-1,2-dihydroxypropyl ether
2-methylenebutyl-2,3-dihydroxypropyl ether
2-methylenepentyl-1,3-dihydroxypropyl ether
2-methylenepentyl-2,3-dihydroxypropyl ether
2-methyl-2-propenyl-1,3-dihydroxypropyl ether
2-methyl-2-propenyl-2,3-dihydroxypropyl ether Any suitable means may be used in effecting copolymerization of acrylonitrile with the 2-alkenyl dihydroxyalkanyl ether. Heat, light, or both heat and light, with or without a polymerization catalyst can be used. A polymerization catalyst preferably is employed in order to shorten the period of time required for polymerization of the mixture of ingredients comprising acrylonitrile and the 2-alkenyl dihydroxyalkanyl ether. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic peracids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxides and of other catalysts that can be employed are given in Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 4 or 5 or more parts of catalyst per 100 parts of the mixture of comonomers.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C. more particularly within the range of 20° C. or 30° C. (ordinary room temperature) to 130° C., depending upon the particular mixture of monomers employed, the particular catalyst, if any, used, the rapidity of polymerization wanted, and other influencing factors. The copolymer can be separated from the liquid medium in which copolymerization was effected by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

*Example 1*

A reaction vessel, equipped with a stirrer, reflux condenser, thermometer and gas-inlet tube, is placed in a constant-temperature bath which is maintained at 35° C. The flask is charged with 47.7 parts of acrylonitrile, 5.3 parts of 3-allyloxy-1,2-propanediol (glycerol-α-allyl ether), 0.03 part of sulfuric acid and 900 parts of water. A rapid stream of pre-purified nitrogen is passed over the surface of the solution for 30 minutes, after which the nitrogen flow is reduced to about one bubble per second. To the stirred solution there is added separately a reduction-oxidation catalyst system ("redox" system) consisting of 1.71 parts of ammonium persulfate, and 0.71 part of sodium meta-bisulfite, $Na_2S_2O_5$, each dissolved in 50 parts of water. The polymerization is continued for a total of 4 hours at 35° C., at the end of which period the pH of the reaction mass is 3.4. The resulting copolymer of acrylonitrile and 3-allyloxy-1,2-propanediol is separated from the slurry by filtration, washed with water and dried in an oven at 70° C. for about 16 hours. The copolymer is obtained in a yield amounting to 44.5 parts. Analysis shows that this copolymer contains 24.95% of nitrogen, from which it can be calculated that it contains 5.2% of 3-allyloxy-1,2-propanediol combined in the copolymer molecule. The specific viscosity, at 25° C., of a solution of 1% of this copolymer dissolved in dimethyl formamide is 1.96. The color stability of a sample of the powdered copolymer, that is, percent reflectance at 450 m$\mu$, is as follows:

| | |
|---|---|
| Initial | 85.7 |
| After 2 hrs. at 150° C | 50.1 |
| Percent loss | 42 |

*Example 2*

Same as in Example 1 with the exception that there is used only 0.355 part of sodium beta-bisulfite. In this case the yield of copolymer is 41.5 parts. A solution is prepared by stirring 5 parts of the copolymer with 45 parts of a 55% aqueous solution of sodium thiocyanate. Clear and tough gels of the copolymer are produced by casting films of the copolymer solution on glass plates, followed by coagulation in ice water. Such solutions can be used in the production of synthetic fibers as disclosed and claimed in, for example, Patents 2,558,730, –1, –2 and –3.

To demonstrate that the incorporation of 3-allyloxy-1,2-propanediol in the acrylonitrile copolymer molecule renders the resulting product more hydrophilic than homopolymeric acrylonitrile, a sample of the dry, powdered copolymer is exposed to 85% relative humidity for 3 days. At the end of this period of time it shows a gain in weight of 1.4% whereas homopolymeric acrylonitrile, when subjected to this same test, shows a gain of only 1.1%.

*Example 3*

Exactly the same formulation and procedure are followed as described under Example 1 with the exception that 42.4 parts of acrylonitrile and 5.3 parts of methyl acrylate are used instead of 47.7 parts of acrylonitrile. The resulting copolymer of acrylonitrile, methyl acrylate and 3-allyloxy-1,2-propanediol is more hydrophilic than a similarly made copolymer of the same proportions of acrylonitrile and methyl acrylate but which contains no 3-allyloxy-1,2-propanediol. The copolymer of this example is especially suitable for use in making synthetic fibers.

*Example 4*

This example illustrates the production of a copolymer of acrylonitrile and 3-methallyloxy-1,2-propanediol (glycerol-α-methallyl ether), the formula for which is (I) 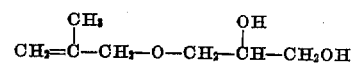

| | Parts |
|---|---|
| Acrylonitrile | 45.0 |
| 3-methallyloxy-1,2-propanediol | 5.0 |
| Ammonium persulfate | 0.05 |
| Water | 1000.0 |

The above ingredients are added to a reaction vessel provided with a stirrer and reflux condenser. This vessel is placed on a steam bath, and the reaction mass is heated, with stirring, to reflux temperature. After stirring and refluxing for 5 hours, the resulting copolymer of acrylonitrile and 3-methallyloxy-1,2-propanediol is collected on a Büchner funnel, and then washed and dried as in Example 1. The dried copolymer is much more hydrophilic than a similarly made homopolymer of acrylonitrile.

*Example 5*

This example illustrates the preparation of a copolymer of acrylonitrile and 3-(1,1-dimethylallyloxy)-1,2-propanediol, the formula for which is

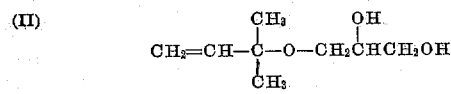

(II)

Exactly the same procedure is followed as described under Example 1. The resulting copolymer of acrylonitrile and 3-(1,1-dimethylallyloxy)-1,2-propanediol is more hydrophilic than a homopolymer of acrylonitrile which has been produced in exactly the same manner. The copolymer of this example has particular utility in the production of synthetic fibers.

*Example 6*

Exactly the same formulation and procedure are followed as described under Example 1 with the exception that 47.7 parts of acrylonitrile, 2.65 parts of 2-vinylpyridine and 2.65 parts of 3-allyloxy-1,2-propanediol are used in place of 47.7 parts of acrylonitrile and 5.3 parts of 3-allyloxy-1,2-propanediol; also, 1.3 parts of sulfuric acid is used instead of 0.03 part as in Example 1. The resulting copolymer of acrylonitrile, 2-vinylpyridine and 3-allyloxy-1,2-propanediol is tested for its dyeability as described in the following example.

*Example 7*

A sample (5 parts) of the dry copolymer of Example 6 is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the copolymer is filtered off and washed with hot water until the water is free of dye. The copolymer is dyed blue, whereas similarly made homopolymeric acrylonitrile fails to absorb any dye.

It will be understood, of course, by those skilled in the art that my invention is not limited to the specific ingredients named in the above illustrative examples nor to the particular proportions and method of copolymerization mentioned therein. Thus, instead of the particular catalyst or particular reduction-oxidation ("redox") catalyst system named in the different examples, any other polymerization catalyst or combination of polymerization catalysts, numerous examples of which have been given hereinbefore, can be used.

Likewise, other modifying comonomers, in addition to the methyl acrylate named in Example 3 or the 2-vinylpyridine of Example 6, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), acrylamide, and the various substituted acrylamides (e. g., methacrylamide, ethacrylamide, the various N-substituted acrylamides and the various N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters; e. g., vinyl acetate, vinyl propionate, vinyl butyrate, vinyl isobutyrate, vinyl valerate, vinyl acrylate, vinyl methacrylate, etc., esters of an acrylic acid, more particularly the alkyl esters of acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic acid, including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and the 2-alkenyl dihydroxyalkanyl ether can be varied as desired or as conditions may require. Ordinarily, however, the acrylonitrile constitutes a major or preponderant proportion (more than 50%) by weight of the total weight of monomers to be copolymerized, the 2-alkenyl dihydroxyalkanyl ether constitutes from about 1% to about 20% of the total weight of the acrylonitrile and 2-alkenyl dihydroxyalkanyl ether, and any modifying comonomer or comonomers (if present in the polymerizable mixture) constitute the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 1% to about 20% by weight of combined 2-alkenyl dihydroxyalkanyl ether, for instance between about 1 or 2% and about 10 or 15% by weight of such a compound, it may be necessary to start with an amount of the 2-alkenyl dihydroxyalkanyl ether either more or less than that which is present in the finished copolymer in order that the said copolymer will have the ultimate composition desired or required in order to impart the optimum properties thereto; for instance, if it is to be used in the production of a fiber, optimum hydrophilic properties combined with optimum fiber-forming characteristics.

Although the new copolymers of this invention are particularly useful in the formation of fibers or filaments which are more hydrophilic and hence, in general, more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., at temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions from which are obtained the copolymers of the invention can be used in the production of castings of any desired shape or size; as adhesives; in the treatment of paper or paper stock; for treating cotton, wool and other textile materials to improve their useful properties; in coating compositions; and for various other purposes. The copolymer can be formed in situ after application of the monomeric mixture to the base material to be coated, impregnated or otherwise treated. For some applications, the copolymers themselves (especially those of low or medium molecular weight) can be used in the form of solutions or dispersions in the treatment of paper, textiles, etc., and then later (as desired or as may be required) can be polymerized in situ to a copolymer of higher molecular weight.

The copolymers of this invention also may be used as modifiers, more particularly as plasticizers, of various other synthetic resins, for instance aminoplasts such as aminotriazine-aldehyde resins (e. g., melamine-formaldehyde resins, etc.), urea-aldehyde resins (e. g., urea-formaldehyde resins, etc.), as well as others.

The unoriented and oriented fibers produced from my new copolymers can be dyed while the fiber is in either a gel (e. g., hydrogel or aquagel) or a dry state.

I claim:

1. A composition comprising a ternary polymer which is a product of polymerization of a mixture of copolymerizable ingredients including, by weight, (1) more than 50% of acrylonitrile, (2) a 2-alkenyl dihydroxyalkanyl ether containing from 3 to 4 carbon atoms, inclusive, in the dihydroxyalkanyl radical thereof and being present in an amount corresponding to from about 1% to about 20% of the total weight of the said acrylonitrile and the said 2-alkenyl dihydroxyalkanyl ether, and the remainder being (3) a compound of the class consisting of alkyl acrylates and vinylpyridines.

2. A composition as in claim 1 wherein the amount of acrylonitrile employed in the mixture of copolymerizable ingredients is such that at least 85% by weight of combined acrylonitrile is present in the ternary polymer.

3. A composition as in claim 1 wherein the 2-alkenyl dihydroxyalkanyl ether is a 2-methylenealkanyl dihydroxypropyl ether.

4. A composition as in claim 3 wherein the 2-methylenealkanyl dihydroxypropyl ether is 3-allyloxy-1,2-propanediol.

5. A composition as in claim 1 wherein the compound of (3) is an alkyl acrylate.

6. A composition as in claim 5 wherein the alkyl acrylate is methyl acrylate.

7. A composition as in claim 1 wherein the compound of (3) is a vinylpyridine.

8. A composition as in claim 7 wherein the vinylpyridine is 2-vinylpyridine.

9. A composition comprising a ternary polymer which is a product of polymerization of a mixture of copolymerizable ingredients including, by weight, (1) more than 50% of acrylonitrile, (2) 3-allyloxy-1,2-propanediol in an amount corresponding to from about 1% to about 20% of the total weight of the said arcrylonitrile and the said 3-allyloxy-1,2-propanediol, and the remainder being (3) methyl acrylate.

10. A composition comprising a ternary polymer which is a product of polymerization of a mixture of copolymerizable ingredients consisting of 42.4 parts of acrylonitrile, 5.3 parts of 3-allyloxy-1,2-propanediol and 5.3 parts of methyl acrylate.

11. A composition comprising a ternary polymer which is a product of polymerization of a mixture of copolymerizable ingredients including, by weight, (1) more than 50% of acrylonitrile, (2) 3-allyloxy-1,2-propanediol in an amount corresponding to from about 1% to about 20% of the total weight of the said acrylonitrile and the said 3-allyloxy-1,2-propanediol, and the remainder being (3) 2-vinylpyridine.

12. A composition comprising a ternary polymer which is a product of polymerization of a mixture of copolymerizable ingredients consisting of 47.7 parts of acrylonitrile, 2.65 parts of 3-allyloxy-1,2-propanediol and 2.65 parts of 2-vinylpyridine.

13. The method of preparing a new ternary polymer which comprises polymerizing in an aqueous medium, with the aid of a polymerization catalyst, a mixture of copolymerizable ingredients including, by weight, (1) more than 50% of acrylonitrile, (2) a 2-alkenyl dihydroxyalkanyl ether containing from 3 to 4 carbon atoms, inclusive, in the dihydroxyalkanyl radical thereof and being present in an amount corresponding to from about 1% to about 20% of the total weight of the said acrylonitrile and the said 2-alkenyl dihydroxyalkanyl ether, and the remainder being (3) a compound of the class consisting of alkyl acrylates and vinylpyridines, and isolating the resulting ternary polymer from the aqueous medium.

References Cited in the file of this patent

UNITED STATES PATENTS 2,516,928     Swern                  Aug. 1, 1950

UNITED STATES PATENT OFFICE

CERTIFICATE OF CORRECTION

Patent No. 2,798,864                                                                        July 9, 1957

Walter M. Thomas

It is hereby certified that error appears in the printed specification of the above numbered patent requiring correction and that the said Letters Patent should read as corrected below.

Column 1, lines 50 and 51, for "acrylontrile" read -- acrylonitrile --; column 2, line 32, after "in" insert -- the --; column 4, line 33, for "beta-bisulfite" read -- meta-bisulfite --; column 8, line 8, for "apcrylonitrile" read -- acrylonitrile --.

Signed and sealed this 17th day of September 1957.

(SEAL)
Attest:

KARL H. AXLINE
Attesting Officer

ROBERT C. WATSON
Commissioner of Patents